Patented Apr. 21, 1925.

1,534,558

UNITED STATES PATENT OFFICE.

OTTO WOLFES AND HORST MAEDER, OF DARMSTADT, GERMANY.

PROCESS OF MANUFACTURE OF D-ψ- AND L-ψ-COCAINE.

No Drawing.    Application filed December 3, 1923.  Serial No. 678,337.

*To all whom it may concern:*

Be it known that we, OTTO WOLFES, Darmstadt, Germany, and HORST MAEDER, Darmstadt, Germany, have invented certain new and useful Improvements in the Process of Manufacture of *d*-ψ- and *l*-ψ-cocaine, of which the following is a clear, full, and exact description.

Willstätter and Bode (Annalen, 326 (1903), p. 42), and Willstätter and Bommer (Annalen, 422 (1921), p. 15) have prepared a racemic form of cocaine, of which it was thought, on account of its properties, that it belonged to the pseudo-series, but attempts to verify this view by converting it into the *d*-ψ-cocaine which is already known, failed. It was impossible, by treatment with optically active acids or by feeding it to *Penicilium glaucum*, to split the racemic form into its optically active components.

It was then found that optically active ψ-cocaine may be obtained by splitting up the corresponding racemic ecgonine ester and then benzoylating the optically active one.

*Example 1.*—Dissolve 2.5 parts *d-l-*ψ-ecgonine methylester, prepared according to Willstätter and Bode, and 3.8 parts *d*-α-bromocamphor-β-sulphonic acid (Armstrong and Lowry, Proceedings of the Chem. Soc., no. 240) in a few c. cm. of absolute alcohol and treat with acetic ether. Eventually, coffin-lid crystals are formed which have a melting point of 198° C. and $$(\alpha)_D^{20} + 71{,}50°.$$

From these crystals *d*-ψ-ecgonine methylester may be separated in the usual manner. It is identical with the natural *d*-ecgonine methylester which has a melting point of 115° c.

Just as from the natural plant product, *d*-ψ-cocaine may be obtained from this synthetic product by benzoylation which is carried out as follows:

The *d*-ψ-ecgonine methylester is dissolved in a little benzol and heated for two hours on the water-bath, with reflux condenser attached, with a little more than calculated quantity of benzoic anhydride, care being taken to prevent access of moisture. After evaporation of the solvent, the residue is treated with ether and ethereal hydrochloric acid. The ethereal solution which contains benzoic acid is then decanted from the solid hydrochloride. The salt is next washed in ether, taken up in water, precipitated by adding sodium carbonate and finally the base is extracted with ether.

The alkaloid, when purified by washing in water and recrystallization from petrol ether, has a melting point of 45° C. Its hydrochloride, which is only with difficulty soluble in water, melts at 205° C. and in 5 per cent solution it has an optical activity of $$(\alpha)_D^{20} + 43°.$$

The base is identical with the natural *d*-ψ-cocaine from plants.

*Example 2.*—Thirty parts of the same racemic ecgonine ester and 47 parts of *d*-α-bromocamphor-π-sulphonic acid (Kipping and Tope, Journ. of the Chem. Soc. 67, p. 356) are dissolved in 60 parts of hot methyl-alcohol and slowly allowed to cool. *d*-α-bromocamphor-π-sulphonic acid *l*-ψ-ecgonine methylester crystallizes out, which has a melting-point of 243° C. and an optical activity of $$(\alpha)_D^{20} + 43.7°,$$

and from which *l*-ψ-ecgonine methylester, melting-point of 115° C., may be obtained. Dissolved in 10 per cent methyl alcohol, it shows an optical activity of $$(\alpha)_D^{20} - 14.8°.$$

Admixture with *d*-ψ-ecgonine methylester results in the formation of the racemic ecgonine ester which has a melting-point of 128° C. If the *l*-ψ-ester is benzoylated, *l*-ψ-cocaine is formed, the antipode of natural dextrorotatory cocaine (*d*-ψ-cocaine).

From the liquor a more readily soluble salt, *d*-α-bromocamphor-π-sulphonic acid *d*-ψ-ecgonine ester having a melting-point of 130° C. may be obtained.

Benzoylation is carried out in the same way as described above (vide first example).

The $l$-ψ-cocaine melts at 45° C.; the hydrochloride, which is with difficulty soluble in water, has a melting-point of 205°, and in 5 per cent aqueous solution shows an optical activity of $$(\alpha)_D^{20} -43°.$$

*Example 3.*—Fifty parts of the racemic ecgonine ester and 33.5 parts of natural malic acid are dissolved in 100 parts of methyl alcohol. The crystals which are subsequently formed consists of $l$-malic acid-$l$-ψ-ecgonine methylester. It has a melting-point of 176° C. and shows an optical activity of $$(\alpha)_D^{20} -18.2°.$$

It is soluble with difficulty only. From the liquor $d$-malic-$d$-ψ-ester may be obtained, which has a melting-point of 142° C.

Claim.

Process of manufacture of $d$-ψ- and $l$-ψ-cocaine by converting $d$-$l$-ψ-ecgonine methylester by means of optically active acids, into the corresponding salts, separating the $l$-ψ-salt from the $d$-ψ-salt by fractional crystallization of the latter, and isolating and benzoylating the bases in the usual manner.

In testimony whereof we have hereunto signed our names in the presence of the two subscribing witnesses.

Dr. OTTO WOLFES.
Dr. HORST MAEDER.

Witnesses:
G. FLESCH,
JANE GIUSTI.